United States Patent [19]

Rowarth

[11] 4,200,253

[45] Apr. 29, 1980

[54] AIRCRAFT WING DROOPING LEADING EDGE DEVICE

[75] Inventor: Ralph Rowarth, South Cave, England

[73] Assignee: British Aerospace, Weybridge, England

[21] Appl. No.: 892,908

[22] Filed: Apr. 3, 1978

[30] Foreign Application Priority Data

Apr. 6, 1977 [GB] United Kingdom ............... 14619/77

[51] Int. Cl.² ................................................ B64C 3/48
[52] U.S. Cl. ...................................... 244/219; 244/214
[58] Field of Search ................................ 244/219, 214

[56] References Cited

U.S. PATENT DOCUMENTS

| | | | |
|---|---|---|---|
| 3,698,668 | 10/1972 | Cole | 244/219 |
| 3,716,209 | 2/1973 | Pierce | 244/219 X |
| 3,836,099 | 9/1974 | O'Neill et al. | 244/214 |
| 3,994,452 | 11/1976 | Cole | 244/214 |
| 4,040,579 | 8/1977 | McKinney | 244/214 |

Primary Examiner—Barry L. Kelmachter
Attorney, Agent, or Firm—Howard L. Rose

[57] ABSTRACT

A drooping leading edge device is provided in which the leading edge structure that droops is pivotally mounted, by a single pivot inside the wing, upon the front spar structure of the wing and is of substantially constant shape. A gap which would otherwise open up between the upper skin of the main part of the wing and the upper skin of the leading edge structure, when the leading edge droops, is filled by an upper flexible skin section secured to the main part of the wing and extending forward first into contiguity with the rear edge of the upper skin of the leading edge structure and then inside said leading edge structure. At the underneath of the wing, a rear flexible portion of the lower skin of the leading edge device extends back to meet the forward edge of the lower skin of the main part of the wing. When the leading edge droops, the profile of the upper flexible skin section is controlled by links inside the structure which are hinged at their upper ends on the upper flexible skin section and at their lower ends on inner structure of the leading edge device.

7 Claims, 2 Drawing Figures

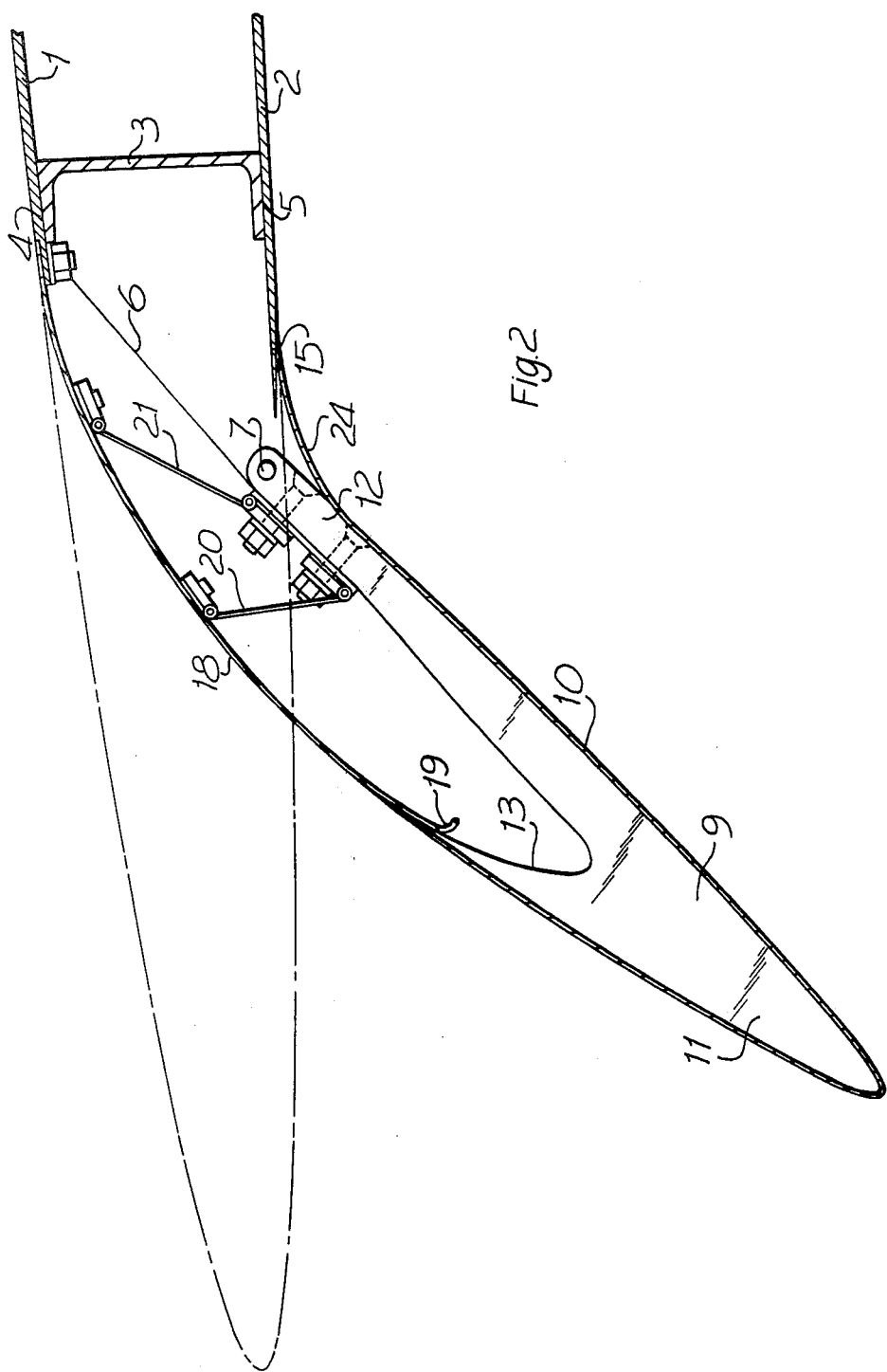

AIRCRAFT WING DROOPING LEADING EDGE DEVICE

This invention relates to high lift leading edge devices for aircraft.

Leading edge devices are used to improve the low speed handling characteristics of aircraft having wings designed to operate at high subsonic and supersonic speeds, for example, by increasing the available lift of the wing during the approach and landing modes, when a high speed airfoil would be aerodynamically inefficient.

One known arrangement of high lift device is the slat, comprising spanwise sections of flap, or similar short-chord length airfoils, extendible from the leading edge of the wing when required, to modify the airflow, thus to induce flow circulation over the wing upper surface with a resultant increase in lift.

There are, however, other known means of physically modifying the basic airfoil shape such that the wing camber may be varied during flight. This must, of necessity, require a wing structure both capable of withstanding induced aerodynamic loading throughout the whole flight regime but at the same time geometrically adaptable when required in order to assume the desired camber, i.e. its structure must be substantially flexible, at least over that portion known as the leading edge.

Known arrangements of flexible leading edge involve operating linkages of significant complexity tending to limit their use in high speed wings which, ideally, should have a low thickness to chord ratio of the order of 5%. A further consequence of such complexity is in the weight and cost penalties which may be incurred. Furthermore, the flexible nature of the design demands that the wing skins, in addition to strictly conforming to the optimised aerodynamic high speed profile, be adequately flexible over at least that portion of the chord to be adapted to the required low speed profile. In known arrangements this has involved a localised moving top panel having a free trailing edge slidable over the adjacent fixed wing structure to accommodate differential movement induced by the flexure and having the correct degree of stiffness to resist lifting under aerodynamic forces. But there may be difficulties in matching this panel profile to that of the wing profile at more than one setting due to the inherent stiffness of the unconstrained trailing edge, resisting the deformation to any other desired profile. Thus there may be unacceptable aerodynamic discontinuities. Yet again, the arbitrary profiles demanded of the panel are frequently not the parabolic profiles which are assumed naturally by a plate fixed at one edge and loaded at the opposite free edge. If the demanded profile is required to meet an acceptable degree of accuracy then a means of adjustment has to be provided which may need to be considerable in extent to cope with the inherent stiffness of the panel and thus inconsistent with the available volume in thin wing sections. It is an object of the present invention to provide an improved form of leading edge which will overcome these various shortcomings.

According to the present invention, the leading edge structure and skin is of substantially constant shape and is hinged to droop into a low speed configuration, flexible skin sections being provided to extend between the constant shape upper and lower skin portions of the leading edge structure and the upper and lower skins of the main body of the wing, the upper flexible skin section being attached to link means for controlling its profile contour as the leading edge structure droops.

One arrangement according to the invention will now be described by way of example with reference to the accompanying drawings in which:

FIG. 2 shows the same leading edge portion in its low-speed deflected configuration.

Figure 1:
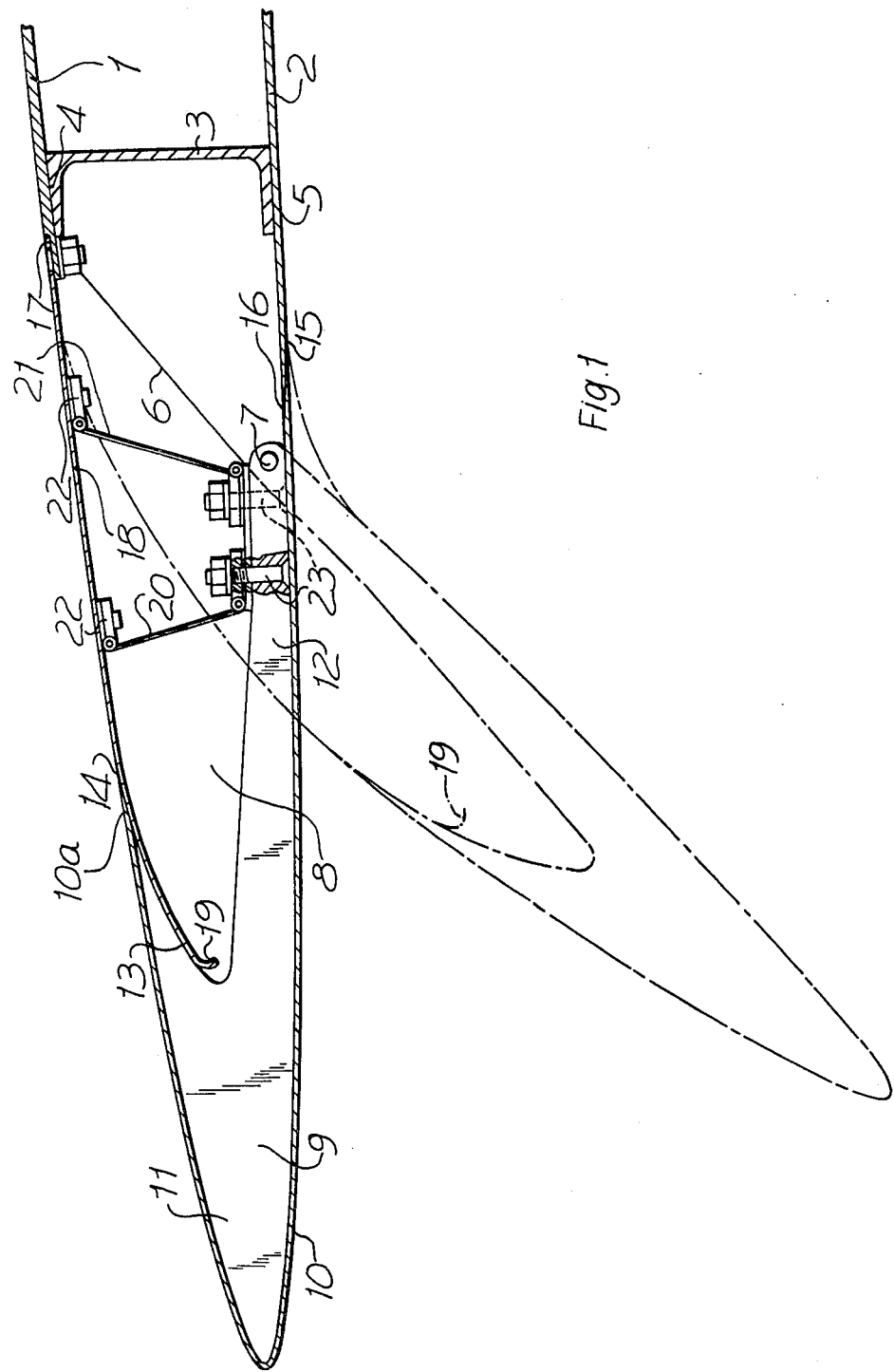
FIG. 1 shows a leading edge portion of a high speed aircraft wing.

The leading edge flap device of the embodiment described is illustrated in FIG. 1 with the wing in its high speed or cruise configuration. That portion of the wing as illustrated comprises an upper wing skin 1 and a lower wing skin 2 and a spanwise extending front spar member 3 having forward facing flanges 4 and 5 and a substantially vertical web 6 extending forwardly of the spar 3 and providing a pivotal attachment 7 for a leading edge structure 9 having an outer skin 10, conforming to the wing profile, supported on a diaphragm 11 whose rearwardly extending leg 12 is hinged at said pivotal attachment 7. The diaphragm 11 is internally shaped to a substantially arcuate profile 13 and the intersection of this profile with the wing upper surface approximately defines the rearward upper boundary 14 of the skin 10 whose inner surface 10a is 'scarfed' to substantially conform to the arcuate profile 13. The rearward lower boundary 15 of the skin 10 is defined by overlapping the lower wing skin 2 extending forward of the spar 3 to terminate at 16. The overlap is 'scarf-jointed' to ensure minimal discontinuity of the wing profile but there are no physical attachments, thus permitting a sliding action during the camber change.

The upper wing skin 1 extending just forward of the spar flange 4 has a rebate 17 in its outer surface substantially conforming in thickness to a flexible top skin 18 to which it is bolted. This skin, which in the preferred arrangement is of standard plate, chemically etched and formed as required, extends forward in conformity with the wing profile except for its most forward portion which passes beneath the leading edge structure, conforming to the arcuate profile 13 and terminating in a reinforcing lip 19. The profile of the flap at any setting is initially designed to a parabolic form, most naturally achieved by a plate fixed at one edge and loaded at the opposite edge. The desired profile of the flexible top skin 18 is maintained by a pair of double piano hinge link assemblies 20 and 21 having riveted attachment to the top skin and bolted attachments 23 to the rearwardly extending leg 12 of the leading edge structure assembly 9, the relatively small size of the hinges ensuring that their effect is as close to the flexible top skin 18 as ideally possible.

Now referring to FIG. 2 showing the flexible leading edge in its low speed configuration, it can be seen that very little rotation of the hinge link assemblies 20 and 21 is required to deform the skin 18 to the desired profile at the full setting and at any intermediate position. As the leading edge is deployed through its operating range, rotation of the leading edge structure 9 about its pivot centre 7 causes a differential sliding action between its arcuate profile 13 and the flexible top skin 18 which together with an accompanying angular variation of the hinge link assemblies 20 and 21 deforms the skin to achieve an overall low speed upper surface profile. In any attitude aerodynamic forces will tend to draw the flexible skin 18 into close contact with the skin 10 of the leading edge structure and form a seal. Additionally, the lower rearward portion 24 of the leading edge skin 10 is similarly deflected, as shown, throughout the operating sequence thus minimising lower surface discontinuities.

Advantages of this invention principally reside in the following features:

(a) The general arrangement with the leading edge structure being of substantially fixed configuration, the elastic deformation being restricted to a small portion of the wing upper surface.

(b) The design of the flexible skin permitting the use of lightweight, uncomplicated components able to be accommodated in the thinnest airfoil sections.

(c) Simplicity of manufacture and assembly.

(d) Overall advantage of life/cost/weight effectiveness.

I claim:

1. An aircraft wing with a high lift leading edge device, comprising a wing main body having upper and lower skins, a leading edge structure with a skin having upper and lower skin portions said leading edge structure being substantially rigid thereby preserving a substantially constant skin shape, single-axis hinge means whereby said leading edge structure is hingedly mounted on said wing main body to droop downward into a low speed configuration, an upper flexible skin section extending between the constant shape upper skin portion of the leading edge structure and the upper skin of the main body of the wing, a lower flexible skin section extending between the constant shape lower skin portion of the leading edge structure and the lower skin of the main body of the wing, said single-axis hinge means being located adjacent said lower flexible skin section, and link means to which the upper flexible skin section is attached for controlling the profile contour of said upper flexible skin section as the constant shape leading edge structure droops, and wherein the leading edge structure has an arcuate internal profile, and the upper flexible skin section extends forward inside said leading edge structure in sliding contact with said arcuate internal profile.

2. A wing according to claim 1 wherein the flexible skin sections are of standard metal plate chemically etched and formed.

3. A wing according to claim 1, wherein the upper flexible skin section is attached to the main body of the wing and the lower flexible skin section is a rearward continuation of the lower portion of the skin of the leading edge structure.

4. A wing according to claim 1 or claim 2 or claim 3, wherein the upper portion of the skin of the leading edge structure is scarfed at its edge where said upper portion of the skin of the leading edge structure contacts the upper flexible skin section.

5. A wing according to claim 1 or claim 2 or claim 3, wherein the rear edge of the lower portion of the skin of the leading edge structure and the forward edge of the lower skin of the main wing structure overlap in a scarfed joint.

6. A wing according to claim 1 or claim 2 or claim 3, wherein the leading edge structure has a rearwardly extending leg inside and adjacent the lower portion of its skin, said leg being pivotally mounted at its rear end on a forwardly extending web of a front wing spar forming part of the main wing body.

7. A wing according to claim 6, wherein said link means comprises two links spaced in the fore and aft direction, the upper ends of the links being hinge-jointed to the upper flexible skin section and the lower ends of the links being hinge-jointed to the rearwardly extending leg of the leading edge structure.

* * * * *